United States Patent [19]

Raczynski et al.

[11] 4,164,300
[45] Aug. 14, 1979

[54] DETACHABLE HANDLES AND DRUM ASSEMBLIES

[75] Inventors: Michael E. Raczynski; William G. Streiff, both of Holland, Mich.

[73] Assignee: BASF Wyandotte Corporation, Wyandotte, Mich.

[21] Appl. No.: 877,176

[22] Filed: Feb. 13, 1978

[51] Int. Cl.² ............................................. B65D 25/28
[52] U.S. Cl. ..................................... 220/94 R; 294/90
[58] Field of Search ................. 220/94 R, 320, 79, 96; 294/90, 15

[56] References Cited
U.S. PATENT DOCUMENTS

| | | | |
|---|---|---|---|
| 563,136 | 6/1896 | Caswell | 294/15 |
| 880,582 | 3/1908 | Secrest | 294/15 |
| 2,764,447 | 9/1956 | Schmidt, Jr. | 294/15 |
| 3,190,685 | 6/1965 | Bopp | 294/90 |
| 3,330,591 | 7/1967 | Pavelka | 294/90 |
| 3,333,883 | 8/1967 | Kikuchi | 294/90 |
| 3,915,488 | 10/1975 | Anderson | 294/90 |

FOREIGN PATENT DOCUMENTS 1337169 11/1973 United Kingdom ...................... 220/79

*Primary Examiner*—William Price
*Assistant Examiner*—Joseph Man-Fu Moy
*Attorney, Agent, or Firm*—Joseph D. Michaels; Bernhard R. Swick

[57] ABSTRACT

An assembly for the manual movement of relatively heavy material in a thin walled, handleless, and stackable drum without damage to the drum. The assembly includes a thin walled drum having an upper chine, a cover mounted on the chine and closing the drum, the cover having an annular downwardly extending groove located adjacent the chine and a v-type toggle clamp assembly connecting the cover to the drum along with a pair of spaced, detachable handle assemblies. Each handle assembly has a bracket having a pair of spaced abutments to engage the under side of the drum chine, a handle means pivotally mounted on the bracket to extend into the cover groove to secure the handle assembly to the drum and cover and a bracket strap to prevent rotation of the handle assembly about the drum chine during the lifting of the drum.

10 Claims, 4 Drawing Figures

DETACHABLE HANDLES AND DRUM ASSEMBLIES

BACKGROUND OF THE INVENTION

1. Field of the Invention

This invention pertains to detachable handles and drum assemblies.

2. Description of the Prior Art

A conventional detachable handles and drum assembly may (when assembled) include a pair of spaced, detachable handles connected to the drum on diametrically opposite sides. The drum may be of thin walled construction and include an upper chine and a cover mounted on the chine and closing the drum with a v-type clamp assembly connecting the two securely together. The cover may also have an annular downwardly extending groove generally adjacent the chine. Each of the handles may include a lower tong attached to the underside of the chine and biased thereto by a spring and an upper tong having an end extending into the cover groove and another end including a handle for grasping by an operator. While the above handles are easily attached and detached to the drum by a worker for each handle, yet when the drum is lifted, because of the weight (which may be 160 lbs.) and the thickness of the drum wall (which may be less than 1/16" thick) the handles will bend the cover and drum as they pivot about the chine, thus damaging the drum. This occurs even with the use of the clamping assembly which adds rigidity.

There exists, therefore, a need for a pair of devices adapted for use with the drum and cover that can be easily attached to the drum by a pair of workers to lift the drum without damage and carry same to a desired location and detach for future use.

SUMMARY OF THE INVENTION

Applicants have designed a detachable handle assembly specifically for use with the noted drum, cover, and clamping assembly of the prior art. Generally the detachable handle assembly includes a lower bracket having a pair of spaced supports adapted to engage the underside of the drum chine. Also included is a handle means pivotally mounted on the bracket and adapted to extend into the cover groove to fasten the handle assembly to the drum and cover. The bracket also has a strap that contacts and extends toward the center of the cover that prevents rotation of the handle about the chine and the bending of the drum and cover.

Specifically, applicants locate the strap and handle means midway between the abutments to prevent tipping of the drum about an axis through the center of the drum. For ease of the detachability, applicants include a handle, and a spring loaded plunger that is moved into the cover groove by the handle along with a handle stop so that the plunger only extends into the groove but does not place pressure on same, thereby merely attaching the handle assembly to the cover and drum with the spring moving the plunger upward from the groove upon relaxation of the handle. The abutments contact the chine inward of the clamp so that the load on the abutments is also resisted by the rigidity of the drum chine, cover and clamp assembly to prevent bending. Use of the detachable handle assembly has allowed the easy transport of filled drums as needed without damage to the drum or cover and eliminated the need for expensive, permanent, handles for each drum which also interferes with drum stacking.

It is, therefore, an object of this invention to provide a new and improved detachable handles and drum assembly.

Another object of this invention is to provide a new and improved detachable handle assembly for lifting heavy material in thin walled drums.

DESCRIPTION OF THE PREFERRED EMBODIMENT

Figure 1:
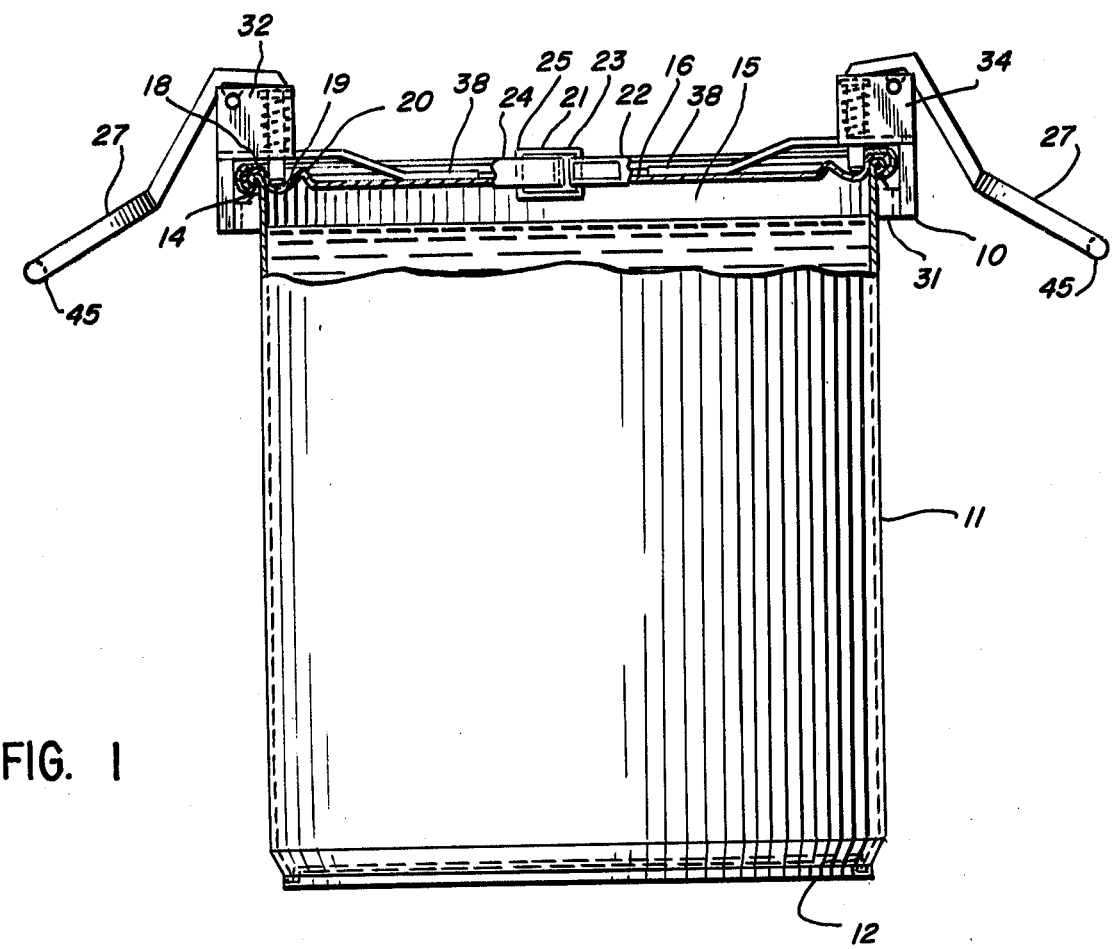
FIG. 1 is a side view, partially in section, with some portions removed, of the detachable handles and drum assembly of this invention with the handles assembled but prior to lifting of the drum.

Referring to FIGS. 1-4, 10 indicates a detachable handles and drum assembly. Assembly 10 includes drum 11. Drum 11 may be made of steel and have a wall thickness of approximately 1/32 of an inch. As shown in FIG. 1, drum 11 may have an inner diameter of 16 inches I.D. and a height of about 18¾ inches. When filled with flush color, the drum may weigh about 150 lbs. The drum may be constructed by rolling steel sheet to the desired dimentions and welding same together. The drum has a tapered bottom portion which is enclosed by a dished bottom 12 that is welded to the wall of the drum. Drum 11 also has a rolled upper chine 14 that surrounds the upper open portion 15 of the drum. Closing the open portion 15 of drum 11 is cover 16. Cover 16 has an annular lip 18 that fits over chine 14. Inward of lip 18 is annular groove 19 that extends downwardly from the cover upper surface and is located generally adjacent chine 14 and is defined by lip 18 and inner annular ridge 20 of cover 16. Securely fastening cover 16 to chine 14 of drum 11 is v-type toggle clamp 21. Clamp 21 includes an annular band 22 having upper and lower inclined surfaces that engage suitably proportioned lip surfaces and chine surfaces to draw the cover to the drum when tightened. To achieve the tightening effect, clamp 21 has link 23 pivotally connected to one end of band 22 and link 24 pivotally connected to the other end and a pivotal connection 25 between links 23 and 24. Upon the closing of link 24 toward the band 22, the pivotal connection 25 between the links 23 and 24 is moved over center behind the pivotal connection between link 24 and band 22. A suitable latch (not shown) may be provided to prevent movement of link 23 to the open position. It is to be noted that clamp 21 in conjunction with cover 16 and chine 14 tightly closes the open portion of drum 11 thereby providing rigidity to this end of the drum to lifting loads applied thereto. To provide an effective seal between cover 16 at lip 18 and chine 14, sealing means may be installed (not shown) between the surfaces.

Also a part of detachable handles and drum assembly 10 is the pair of identical detachable handle assemblies shown. Each handle assembly, which may be denominated 27, is preferably mounted on diametrically opposed sides of drum 11. Handle assembly 27, as shown best in FIGS. 2, 3, and 4, includes a bracket 28. Bracket 28 has a pair of spaced abutments 29 and 30 located on an arc shaped member 31 that is complementary to the under side of chine 14 of drum 11. Rigidly attached to member 31 are spaced plates 32 and 34 of bracket 28. Providing rigidity at the top of plates 32 and 34 is support member 36 that is rigidly connected to the plates. Bracket strap 37 is located between member 36 and member 31 and connects plates 32 and 34 together. Strap 37 also has a portion 38 that also extends substantially away from member 31 and is constructed to extend downwardly toward and to contact cover 16 when assembled thereto as shown in FIG. 1. Support member 36 and strap 37 have aligned holes 39 and 40 respectively for plunger 41 movably mounted therein. Spring 42 extending between strap 37 and pin 44 (which extends from opposed sides of plunger 41) biases plunger 41 toward support member 36.

Also a part of handle assembly 27 is handle 45 which is adapted to be grasped by a worker. Handle 45 is connected to sleeve 46 by welding or the like and is pivotally mounted on headed shaft 48 rigidly attached to plate 34. Handle 45 has head 49 that contacts plunger 41. As shown best in FIG. 2, spring 42 biases plunger 41 and therefore handle 45 to the position shown in solid lines wherein strap 37 provides a stop to further handle travel. Also as noted in FIG. 1, support member 36 provides a stop when handle 45 is moved to the position shown in broken lines. Thus the length of travel of plunger 41 is controlled.

Figure 2:
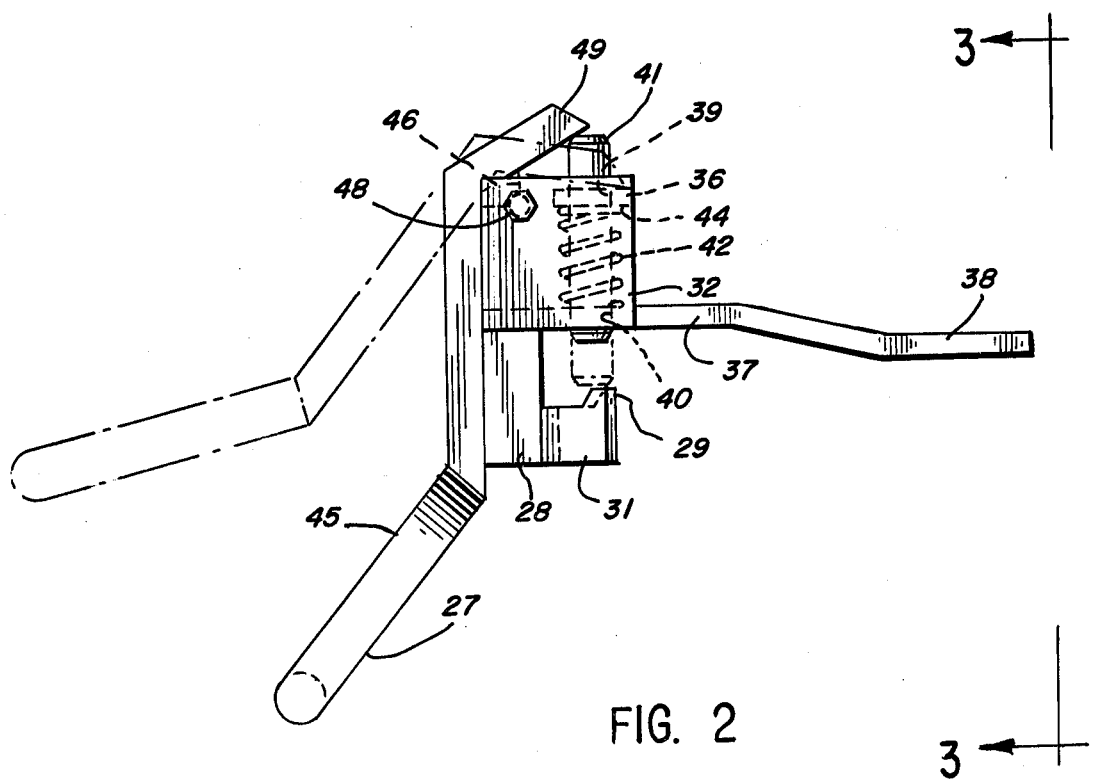
FIG. 2 is a side view of a detachable handle assembly of this invention with the handle travel shown in broken lines.
Figure 3:
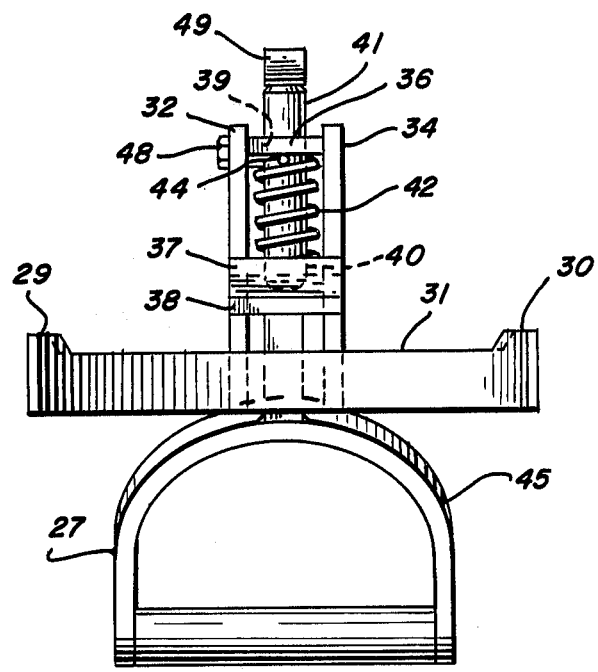
FIG. 3 is an end view taken along line 3—3 of FIG. 2.
Figure 4:
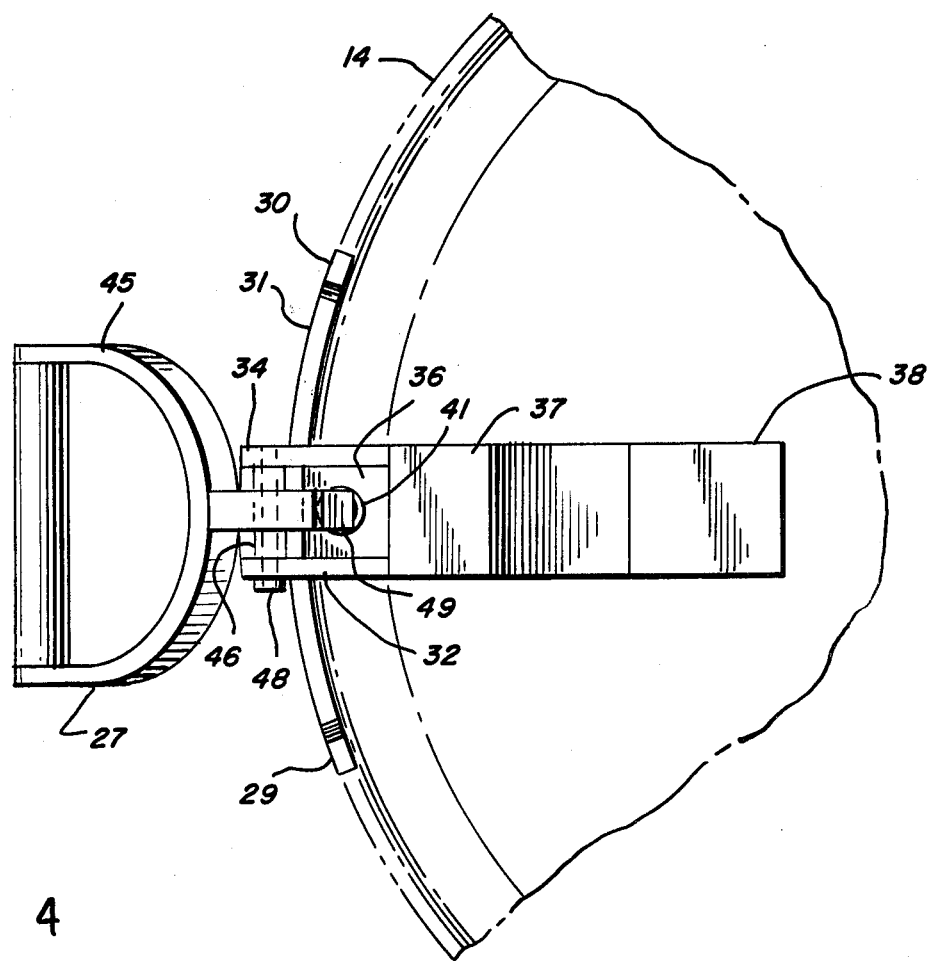
FIG. 4 is a plan view of the handle assembly with the drum and cover for use therewith shown in broken lines.

In operation, if a pair of workers want to transport filled drum 11 with cover 16 (preferably) connected thereto by clamp 21, each worker slides the detachable handle assembly 27 as shown in the solid line position of FIGS. 2, 3, and 4 (due to the action of spring 42) into position on the drum of FIG. 1 on opposed sides thereof. Since the plunger is retracted, the handle assembly 27 can be easily moved into position on the drum with the abutments 29 and 30 under the chine 14 and the strap portion 38 resting upon the cover. When each worker lifts the handle 45 the handle forces the plunger 41 into the groove 19 of cover 16. The plunger is then retained in groove 19 and the handle is attached to the drum and cover and cannot be removed. The handle 45 has engaged the support member 36 and further travel of plunger 41 and handle 45 is stopped thus preventing damage to the cover. The handles and drum assembly 10 is then in the position shown in FIG. 1, but lifting of the drum has not yet taken place. As each worker now lifts the drum the abutments of each handle are initially raised against the chine and the whole bracket pivots slightly about the abutments until stopped by the strap 38 without therefore bending of the drum or cover. Further lifting of the drum by the essentially solid lever handle is now easily accomplished with no danger that the handles will slide off the drum. When it is desired to set the drum down, same is lowered to the ground, for example, and as the lifting force is removed from the handle, spring 42 biases the plunger 41 to the disengaged position and the handle 45 to the stop against strap 37. The handle assembly 27 can now be easily removed from the drum and cover for moving another drum.

The placing of the strap and handle of each handle assembly midway between the spaced abutments prevents the tilting of the heavy drum about a central axis while the drum is being transported.

Having thus described the invention, it will be apparent to those skilled in the art that various changes and modifications can be made without departure from the spirit of the invention or the scope of the appended claims.

We claim:
1. A detachable handles and drum assembly comprising:
   (a) an open top drum for the transport of material, said drum having an upper chine surrounding said open top;
   (b) a cover enclosing said open top of said drum and extending over said chine, said cover having an annular groove extending below the top of said cover and located adjacent said chine;
   (c) a pair of detachable handle assemblies detachably connected to said drum and said cover at spaced intervals, each handle assembly comprising: a bracket having a pair of spaced supports engaging the underside of said chine, said bracket also having an upper elongated portion contacting and extending over the top of said cover, a handle pivotally mounted on said bracket and a plunger movably mounted on said bracket and extending into said groove between said supports to secure the handle assembly to said drum and cover, said elongated portion preventing rotation of said handle assembly about said chine during lifting of said drum.

2. The assembly of claim 1 in which said handle has a head at its distal end in contact with said plunger.

3. The assembly of claim 2 further comprising stop means for said handle and spring means for biasing said plunger and said handle away from said cover for detachment of said handle assembly.

4. The assembly of claim 3 in which said elongated portion is located midway between said supports and has an opening therethrough and said plunger extends through said opening.

5. The assembly of claim 4 further comprising clamp means for clamping said cover to said drum about said chine.

6. The assembly of claim 5 in which said clamp means is a toggle, v-type clamp assembly.

7. A detachable handle assembly adapted for connection to a drum having a chine and a cover attached to the chine and closing the drum, the cover having an annular downwardly extending groove adjacent the chine, said handle assembly comprising:
   (a) a bracket having a pair of spaced supports adapted for engaging the underside of the chine, said bracket also having an upper, elongated portion adapted to contact and extend along the upper surface of the cover;
   (b) a handle pivotally mounted on said bracket; and
   (c) a plunger movably mounted on said bracket and adapted to travel into the cover groove between said supports to secure the handle assembly to the drum and cover, said elongated portion preventing rotation of the handle assembly about the chine during lifting of the drum.

8. The handle assembly of claim 7 in which said handle is adapted to move said plunger to extend into the cover groove.

9. The handle assembly of claim 8 further comprising stop means for said handle and spring means for biasing said plunger and therefore said handle away from the cover for detachment of said handle assembly.

10. The handle assembly of claim 9 in which said elongated portion is located midway between said supports and has an opening therethrough and said plunger extends through said opening.

* * * * *